United States Patent
High et al.

(10) Patent No.: US 10,592,964 B2
(45) Date of Patent: Mar. 17, 2020

(54) ORDER FULFILLMENT MANAGEMENT

(71) Applicant: Walmart Apollo, LLC, Bentonville, AR (US)

(72) Inventors: Donald R. High, Noel, MO (US); Chandrashekar Natarajan, Valencia, CA (US); John J. O'Brien, Farmington, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 323 days.

(21) Appl. No.: 15/471,592

(22) Filed: Mar. 28, 2017

(65) Prior Publication Data

US 2017/0287052 A1 Oct. 5, 2017

Related U.S. Application Data

(60) Provisional application No. 62/324,106, filed on Apr. 18, 2016, provisional application No. 62/314,703, filed on Mar. 29, 2016.

(51) Int. Cl.
*G06Q 30/06* (2012.01)
*G06Q 10/08* (2012.01)

(52) U.S. Cl.
CPC ....... *G06Q 30/0635* (2013.01); *G06Q 10/083* (2013.01)

(58) Field of Classification Search
None
See application file for complete search history.

(56) References Cited

U.S. PATENT DOCUMENTS 6,240,362 B1 5/2001 Gaspard, II
6,385,537 B2 5/2002 Gaspard, II
(Continued)

FOREIGN PATENT DOCUMENTS

CN 103679316 3/2014

OTHER PUBLICATIONS

Same-day delivery: The next evolutionary step in parcel logistics, Hausmann, Mar. 2014, available at https://www.mckinsey.com/industries/travel-transport-and-logistics/our-insights/same-day-delivery-the-next-evolutionary-step-in-parcel-logistics# (Year: 2014).*

(Continued)

*Primary Examiner* — Ming Shui
(74) *Attorney, Agent, or Firm* — Fitch, Even, Tabin & Flannery LLP (57) ABSTRACT

A system receives an order from a user and evaluates a plurality of potential sources for items of an order as well as delivery options. Combinations of sources and delivery options are assigned a score according to factors such as cost, delivery time, and supply chain factors. A prior-used delivery option for the user is determined and the scores are adjusted to indicate higher desirability for combinations including the prior-used delivery option. A combination is selected and fulfillment of the order is invoked. The source and/or delivery option for an order may be adjusted after fulfillment has begun in response to user instructions or detected disruptions. A user may specify a preferred delivery option that will be used unless a combination not including the preferred delivery option meets a threshold condition. The system may analyze past orders of a user and identify lower cost delivery intervals and/or destinations.

16 Claims, 5 Drawing Sheets

(56) References Cited

U.S. PATENT DOCUMENTS

| | | | |
|---|---|---|---|
| 6,411,897 B1 | 6/2002 | Gaspard, II | |
| 6,806,807 B2 | 10/2004 | Cayne | |
| 7,113,071 B2 | 9/2006 | Cayne | |
| 7,257,552 B1 | 8/2007 | Franco | |
| 7,840,427 B2 | 11/2010 | O'Sullivan | |
| 7,945,469 B2 | 5/2011 | Cohen | |
| 7,945,470 B1 | 5/2011 | Cohen | |
| 8,160,972 B1 | 4/2012 | Tannenbaum | |
| 8,417,550 B2 | 4/2013 | Gabrielson | |
| 8,457,978 B2 | 6/2013 | Williams | |
| 8,510,732 B2 | 8/2013 | Chevrette | |
| 8,554,694 B1 | 10/2013 | Ward | |
| 9,066,206 B2 | 6/2015 | Lin | |
| 9,202,191 B2 | 12/2015 | Bowen | |
| 9,230,292 B2 | 1/2016 | Amin | |
| 9,269,103 B1 | 2/2016 | Kumar | |
| 9,305,310 B2 | 4/2016 | Radhakrishnan | |
| 9,378,479 B2 | 6/2016 | Seifen | |
| 9,459,622 B2 | 10/2016 | Abhyanker | |
| 9,639,908 B1* | 5/2017 | Reiss | G06Q 50/12 |
| 9,718,397 B2 | 8/2017 | Kalanick | |
| 9,721,224 B2 | 8/2017 | Waris | |
| 9,778,057 B2 | 10/2017 | O'Mahony | |
| 9,792,574 B2 | 10/2017 | Lord | |
| 9,805,536 B2 | 10/2017 | Lutnick | |
| 9,811,838 B1 | 11/2017 | Daire | |
| 9,852,551 B2 | 12/2017 | Brinig | |
| 9,902,310 B2 | 2/2018 | Fournier | |
| 9,904,900 B2 | 2/2018 | Cao | |
| 9,928,540 B1 | 3/2018 | Gerard | |
| 9,934,530 B1 | 4/2018 | Iacono | |
| 2002/0040564 A1 | 4/2002 | Killingbeck | |
| 2003/0040944 A1 | 2/2003 | Hileman | |
| 2003/0046173 A1 | 3/2003 | Benjier | |
| 2006/0026030 A1 | 2/2006 | Jacobs | |
| 2007/0192111 A1 | 8/2007 | Chasen | |
| 2009/0043617 A1 | 2/2009 | Thomas | |
| 2011/0059693 A1 | 3/2011 | O'Sullivan | |
| 2012/0030133 A1 | 2/2012 | Rademaker | |
| 2013/0073477 A1 | 3/2013 | Grinberg | |
| 2013/0198042 A1 | 8/2013 | Seifen | |
| 2014/0058902 A1 | 2/2014 | Taylor | |
| 2014/0089032 A1* | 3/2014 | Bell | G06Q 10/06313 705/7.24 |
| 2014/0236856 A1 | 8/2014 | Baykhurazov | |
| 2014/0278634 A1 | 9/2014 | Horvitz | |
| 2014/0278851 A1 | 9/2014 | Kopanati | |
| 2014/0278875 A1 | 9/2014 | Ganesh | |
| 2014/0279294 A1* | 9/2014 | Field-Darragh | G06Q 10/087 705/28 |
| 2014/0297470 A1* | 10/2014 | Ramadge | G06Q 30/0613 705/26.41 |
| 2015/0081581 A1 | 3/2015 | Gishen | |
| 2015/0161563 A1 | 6/2015 | Mehrabi | |
| 2015/0199632 A1 | 7/2015 | Chander | |
| 2015/0206093 A1 | 7/2015 | Trew | |
| 2015/0227890 A1 | 8/2015 | Bednarek | |
| 2015/0242829 A1 | 8/2015 | Bhaskaran | |
| 2015/0339621 A1 | 11/2015 | Hewett | |
| 2015/0339625 A1 | 11/2015 | Agasti | |
| 2015/0347961 A1 | 12/2015 | Gillen | |
| 2015/0348173 A1 | 12/2015 | Gillen | |
| 2015/0363730 A1 | 12/2015 | Crane | |
| 2015/0363843 A1 | 12/2015 | Loppatto | |
| 2016/0019669 A1 | 1/2016 | Gopalakrishnan | |
| 2016/0048804 A1 | 2/2016 | Paul | |
| 2016/0071056 A1 | 3/2016 | Ellison | |
| 2016/0078394 A1 | 3/2016 | Fuldner | |
| 2016/0086128 A1 | 3/2016 | Geiger | |
| 2016/0104112 A1 | 4/2016 | Gorlin | |
| 2016/0104113 A1 | 4/2016 | Gorlin | |
| 2016/0155072 A1 | 6/2016 | Prodromidis | |
| 2016/0189098 A1 | 6/2016 | Beaurepaire | |
| 2016/0195404 A1 | 7/2016 | Prasad | |
| 2016/0225115 A1 | 8/2016 | Levy | |
| 2016/0328678 A1 | 11/2016 | Gillen | |
| 2016/0328781 A1* | 11/2016 | Patel-Zellinger | G06Q 30/0635 |
| 2016/0364678 A1 | 12/2016 | Cao | |
| 2016/0364679 A1 | 12/2016 | Cao | |
| 2016/0364812 A1 | 12/2016 | Cao | |
| 2016/0364823 A1 | 12/2016 | Cao | |
| 2016/0379167 A1 | 12/2016 | Raman | |
| 2017/0032341 A1 | 2/2017 | Johnsrud | |
| 2017/0083862 A1 | 3/2017 | Loubriel | |
| 2017/0089710 A1 | 3/2017 | Slusar | |
| 2017/0091891 A1 | 3/2017 | Van Der Berg | |
| 2017/0124510 A1 | 5/2017 | Caterino | |
| 2017/0140326 A1 | 5/2017 | Rhyu | |
| 2017/0310770 A1 | 10/2017 | Samaan | |
| 2017/0351994 A1 | 12/2017 | Waris | |
| 2018/0096414 A1 | 4/2018 | Iacono | |

OTHER PUBLICATIONS

PCT; App No. PCT/US 17/24518; International Search Report and Written Opinion dated Jun. 22, 2017.

\* cited by examiner

ORDER FULFILLMENT MANAGEMENT

CROSS-REFERENCE TO RELATED APPLICATIONS

This invention claims the benefit of U.S. Provisional Application No. 62/314,703, filed Mar. 29, 2016, and U.S. Provisional Application No. 62/324,106, filed Apr. 18, 2016, which are incorporated herein by reference in their entirety.

FIELD OF THE INVENTION

This invention relates to systems and methods for fulfilling online orders for products.

BACKGROUND OF THE INVENTION

Many of a typical consumer's purchases are made online. Even everyday items are often purchased online and delivered. Although this is very convenient for the customer, it increases the cost and complexity of transactions inasmuch as retrieving a product and shipping it to a customer replace the simple act of the customer retrieving the product from a store shelf and purchasing it at a point of sale.

Accordingly, it would be an advancement in the art to provide systems and methods that reduce shipping costs and logistical challenges that accompany fulfillment of online transactions.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
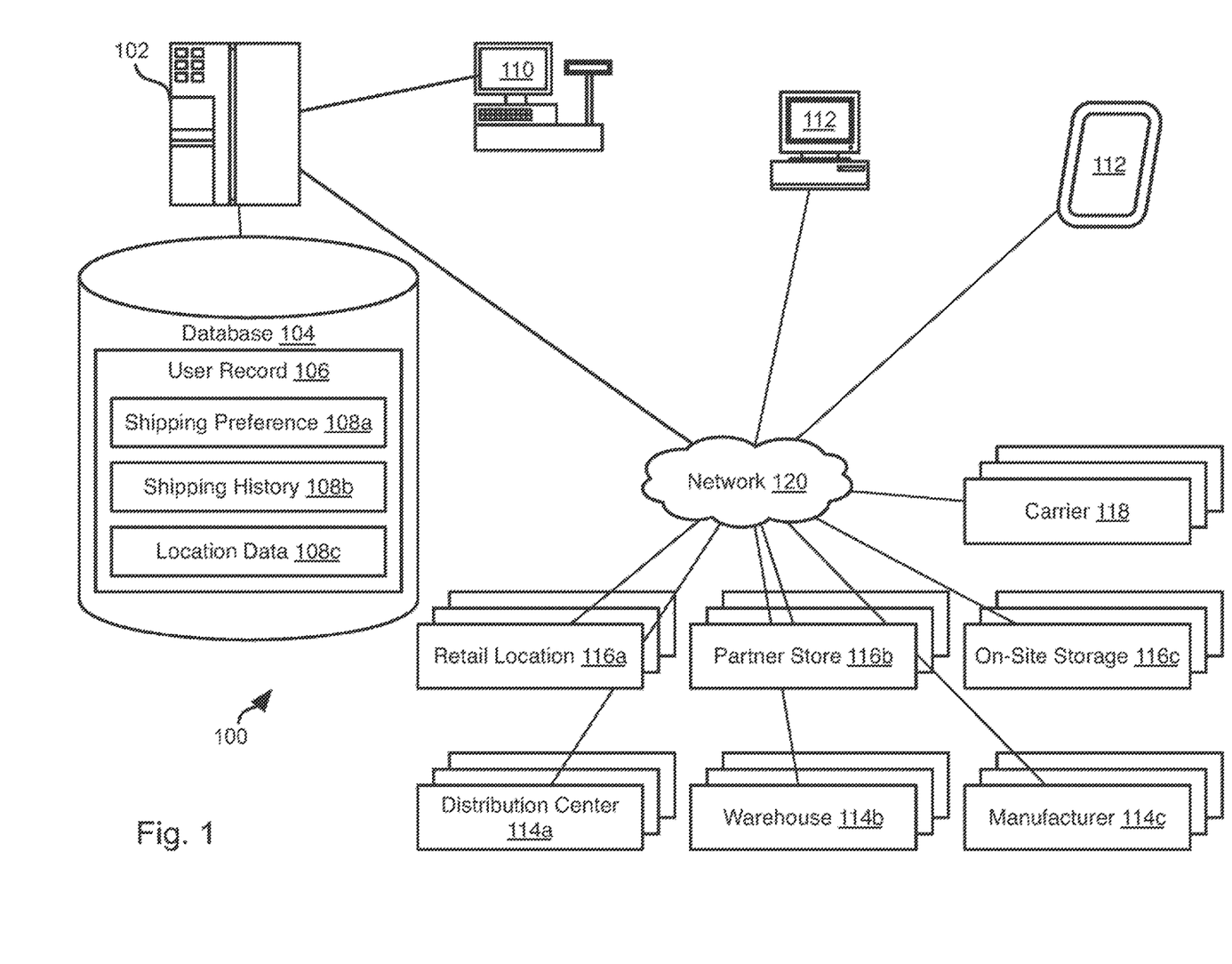
FIG. 1 is a schematic block diagram of a network environment suitable for implementing embodiments of the invention.

Referring to FIG. 1, a network environment 100 may be used to implement methods as described herein. The environment 100 may include a server system 102 operated by a retailer. The server system 102 may host or access a database 104 including a plurality of user records 106. Each user record 106 may correspond to a customer that has conducted one or more online or in-store transactions with the retailer. The user record 106 may include a shipping preference 108a that records some or all of a carrier, a retail location for in-person pick up, and an address for deliveries. The user record 106 may further include a shipping history 108b that stores records of past deliveries to a customer, each record of a delivery may include some or all of the past carriers used by the user, past retail locations used for in-store pick up, past destination addresses for deliveries, one or the products included in the delivery, and the quantity of each product in the delivery.

The user record 106 may further include location data 108c. A retailer may offer an application executing on a mobile device of the user and that reports locations where the application is accessed, i.e. by using reporting a GPS location of the mobile device when the application is executing thereon. Accordingly, these locations along with the date and time the locations were reported may be stored as location data 108c.

The server system 102 may host or access one or more points of sale (POS) 110 that conduct transactions with users. The POS 110 may be an in-store POS, online store, or other POS system. Users may access the POS 110 using user computing devices 112 embodied as desktop or laptop computers, mobile phones, tablet computers, wearable computers, or the like. The user computing devices 112 may further execute a retailer application that reports the location of the user computing device 112 for populating the location data 108c.

In response to orders received from the POS 110 that require fulfillment, i.e. retrieval and shipment to a destination, the server system 102 may select a source for the one or more products of the order. Some potential sources function exclusively as sources and are not available as destinations and sources. For example, a distribution center 114a, warehouse 114b (i.e. not a warehouse store), or a manufacturer 114c. Accordingly, fulfillment of an order may include transmitting an instruction by the server system 102 to computer systems of any of these sources 114a-114c to retrieve and ship one or more products of an order.

Some sources may function as either of a source or a destination for a shipment. For example, a retail location 116a or partner store 116b may retrieve a product from its on-site inventory and ship the product or receive a product shipped from a source 114a-114c for in-store pick up by a customer. Accordingly, a server system may instruct a computer system of a retail location 116a or partner store 116b to display a prompt to retrieve and ship one or more products of an order to a destination.

In some instances, products may be stored in a vending machine-type device in a user's home or neighborhood. Accordingly, a server system 102 may instruct stocking of such an on-site storage device 116c with a product of an order or transmit a message to a user indicating that one or more products of an order are available at an on-site storage device 116c or are reserved for the user on the on-site storage device 116c.

The server system 102 may be in data communication of computer systems of one or more carriers 118, such as FedEx™, UPS™, DHL™, the United States Post Office, a crowdsourcing delivery platform, and the like. Accordingly, the server system 102 may instruct the computer system of a carrier 118 to issue a prompt to pick up a product at any of the sources 116a-116c or 114a-114c and deliver the product to a destination. A carrier 118 may also be any other type of delivery system, such as courier, bike messenger, or the like. Accordingly, the server system 102 may send instructions for pick up and delivery of a product to a computer system for one of these types of delivery mode operators as well.

The server systems 102 may be in data communication with the server POS 108, user computing devices 112, and computer systems of the sources 114a-114c, 116a-116c and carriers 118 by means of a network 120. The network 120 may include any wired or wireless connections and may include some or all of a local area network (LAN), wide area network (WAN), the Internet, or other type of network.

Figure 2:
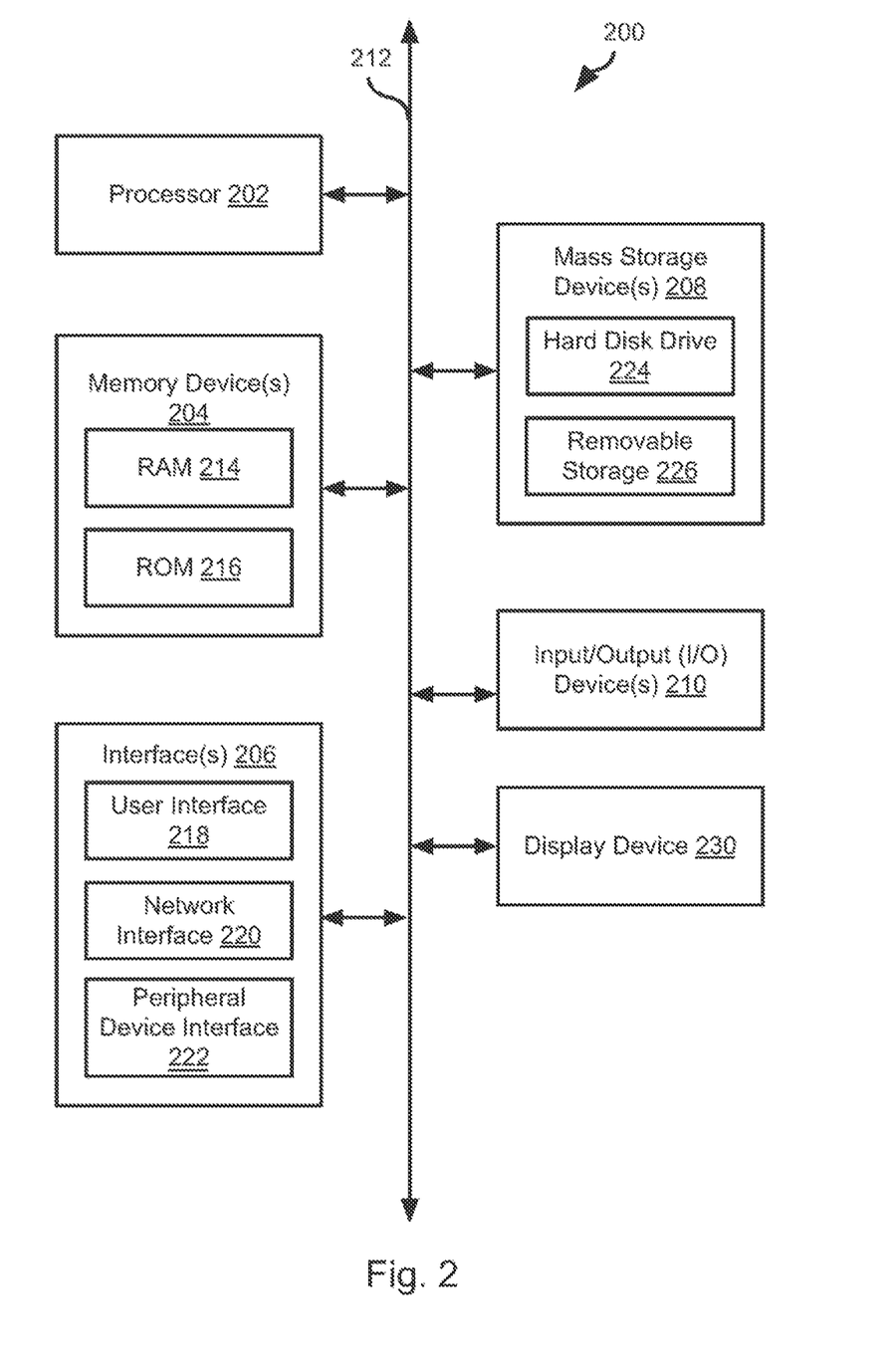
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The server systems 102, POS 110, user computing device 112, and the computer systems of the sources 114a-114c, 116a-116c and carriers 118 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, a tablet computer and the like. A server system 102 may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
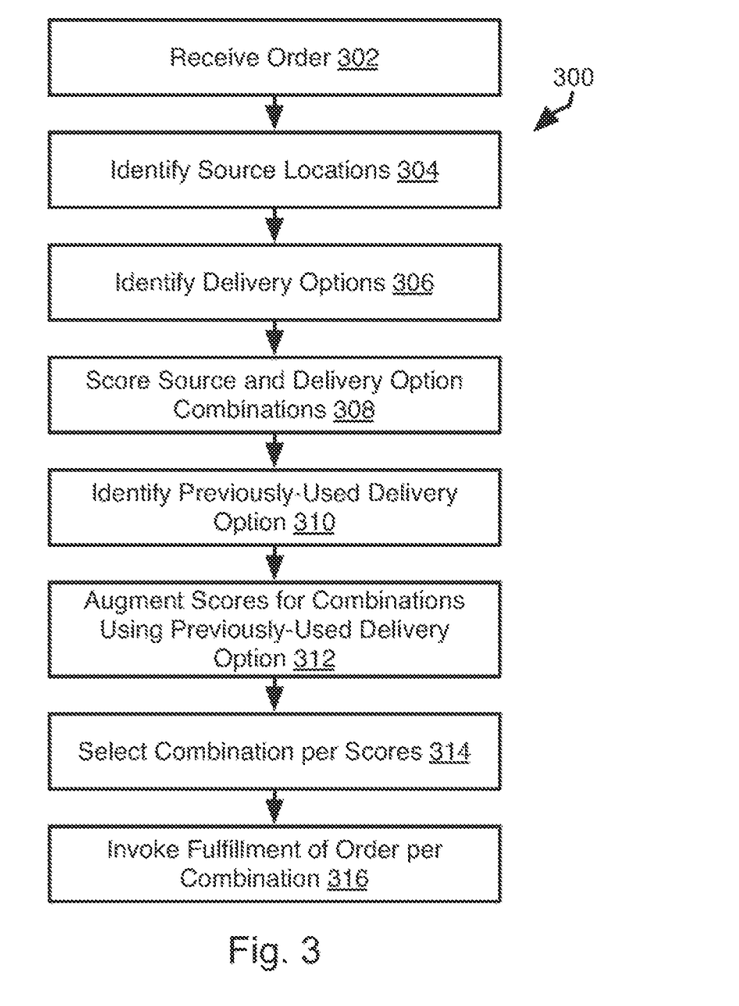
FIG. 3 is a process flow diagram of a method for configuring fulfillment of an online order in accordance with an embodiment of the invention.

Turning now to FIG. 3, the illustrated method 300 may be executed by the server system 102 with respect to an order received at step 302. The order may be placed on a user computing device 112 interacting with an online store. The order may be placed at a POS 110 in a store, e.g. if a desired product is not in stock. The order may be placed automatically as part of a subscription service.

The remaining steps of the method 300 may be executed for the entire or may be executed for each item in an order. For example, different products may be available from different sources 114a-114c, 116a-116d or may not be available at the same time. In some embodiments, whether the items of an order are shipped together or separately is determined automatically based on a function of the increased cost for shipping separately and increased delay for waiting for the last item to be available. For simplicity, the remaining steps are described with respect to a single item ("the item") of an order with the understanding that the steps may also be performed with respect to multiple items or may be executed repeatedly for multiple items.

The method 300 may include identifying 304 one or more source locations of the item from among the sources 114a-114c, 116a-116c. Identifying 304 source locations may include identifying the closest sources 114a-114c, 116a-116c. For example, the closest three, four, or some other number of sources may be identified 304. Step 304 may be performed by the server system by evaluating a database listing identifiers and locations of sources 114a-114c, 116a-116d and identifying those that have locations closest to a destination of the order received at step 302.

The method 300 may include identifying 306 delivery options. For example, carriers may provide coverage maps or electronic descriptions of areas within which deliveries and pick ups may be made. Accordingly, the server system 102 may identify carriers having both at least one of the sources identified at step 304 and the destination of the order in its coverage map. As noted above, some delivery options may include in-store pick up. Accordingly, a retail location or partner store may be identified as a delivery option 306 if it is at least one of (a) recorded in the transaction data of the user as being the site of past purchase of the user, (b) the user has designated it as a destination previously, and (c) it is within some threshold distance of the user's residence or place of work as recorded in the user record 106 of the user.

The method 300 may further include assigning 308 a score to each combination of source and delivery option identified at steps 304, 306. A score may be assigned according to a function that increases with decreasing delivery time and decreases with increasing cost. For example, the inverse of the cost and inverse of the delivery time may be summed or weighted and summed. Alternatively, a lower score may indicate a better choice such that the cost and delivery time are simply summed or weighted and summed. In some instances, the user or retailer may specify a maximum cost. Accordingly, combinations including delivery options exceeding the maximum cost will be discarded by the server system 102 and not considered further according to the method 300.

The score may also be a function of sourcing costs—the same product may have a different price from different sources. Accordingly, the score for a combination may increase with decreasing cost (high score indicates desirability) or decrease with decreasing cost (low score indicates desirability) according to the cost of obtaining the item from the source of the combination. Other costs (including the retailer's costs) relating to obtaining and delivering the item may also be incorporated into the score with higher costs indicating lower desirability.

The score may also be based on other factors. For example, predicted weather conditions for a particular source or delivery options that might disrupt delivery may decrease the desirability of combinations including it. An item requiring special safety and handling precautions may cause the server system to adjust the scores of the combinations to indicate greater desirability for those including sources and delivery options compatible with the precautions.

The method 300 may include identifying 310 a previously-used delivery option. This may include identifying a carrier or in-store pick up location in a record of a prior online order recorded in the user record 106 of the user from which the order was received 302. The scores of combinations including the previously-used delivery option are augmented 312. Where a higher score indicates greater desirability (lower cost and faster delivery time), the scores may be increased as part of the augmenting step 312. Where a lower score indicates greater desirability, then the scores may be decreased as part of the augmenting step 312.

The method 300 may then include selecting 314 a combination according to the scores. For example, the most desirable score may be selected, i.e. the highest score where a high score indicates greater desirability or a lowest score where a low score indicates greater desirability. Alternatively, other factors may be used to select the selected combination. For example, the top N most desirable scores may be selected and then one of them selected according to factors such as a load balancing approach that distributes orders among various sources 114a-114c, 116a-116c to avoid congestion at any particular source.

The method 300 may then include invoking 316 fulfillment of the order according to the combination selected at step 314. In particular, the computer system of the source 114a-114c, 116a-116c of the combination may be notified such that it will issue a prompt to receive the item. Likewise, the computer system of the delivery option (118, 116a-116c) may be notified to pick up the item and deliver it to a destination if the delivery option is a carrier 118. If the delivery option is a retail location 116a, partner store 116b, or on-site storage 116c, then the server system 102 may notify computer the computer system thereof to expect delivery of the item or to issue a prompt to retrieve the item in preparation for an in-person retrieval of the item.

Figure 4:
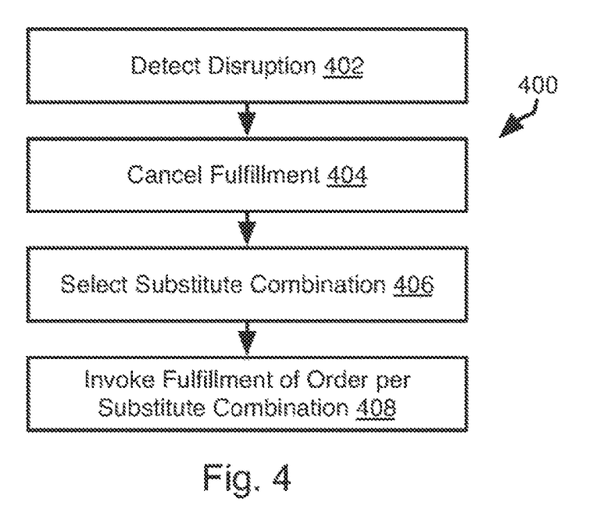
FIG. 4 is a process flow diagram of a method for modifying a fulfillment configuration in accordance with an embodiment of the present invention.

Referring to FIG. 4, the illustrated method 400 may be executed by the server system 102 subsequent to selection 314 of a combination for an order but prior to actual fulfillment of the order. The method 400 may include detecting 402 a disruption in at least one of (a) a supply chain to the source of the combination, (b) a disruption of the delivery option of the combination.

A disruption to the supply chain or delivery option may be detected by receiving a notification of extreme weather at the location of the source, along a route to the source, along a route from the source to the destination. A disruption may include any notification regarding the supply chain that indicates unavailability of the item. For example, a manufacturer delay or failure to fulfill an order, mechanical problems at a distribution warehouse, or any other failure of a critical system used to deliver the item to the source or from the source to the carrier.

In response to detecting 402 the disruption, the server system 102 cancels 404 fulfillment of the order, such as by sending notifications of cancelations to the computer systems of the source and delivery option of the combination. The server system 102 may then select 406 a substitute combination, such as by re-executing the method 300 excluding any combinations including a source or delivery option for which a disruption is currently detected 402. The method 400 may then include invoking 408 fulfillment of the selected substitute combination in the same manner as for step 316 of the method 300.

In some embodiments, the item may have a tracking device (optical code, radio frequency identifier (RFID) tag, etc.) affixed thereto. The precise location of the item may be known. Accordingly, in response to detecting disruption 402 after fulfillment has already begun, selecting 406 a substitute combination may include selecting a substitute delivery option from the current location of the item, rather than identifying new source for a substitute item.

In some embodiments, the method 400 may be executed in response to a user modification of an order rather than to a disruption. Accordingly, selecting 406 a substitute combination may include performing the method 300 with respect to a new destination provided by the customer with the only available source being the current location of the item for which fulfillment has already commenced. The user modification may specify a higher permissible cost and a faster required delivery time. Accordingly, the substitute combination may be selected 406 according to the newly-provided criteria provided by the customer.

In some instances, a user may cancel a portion of an order including multiple items even after fulfillment for all of the multiple items has commenced. Inasmuch as the RFID tags of the items or order will enable its location to be known, the server system 102 may therefore issue an instruction to remove or add an item to an order and then continue fulfillment of the modified order.

Figure 5:
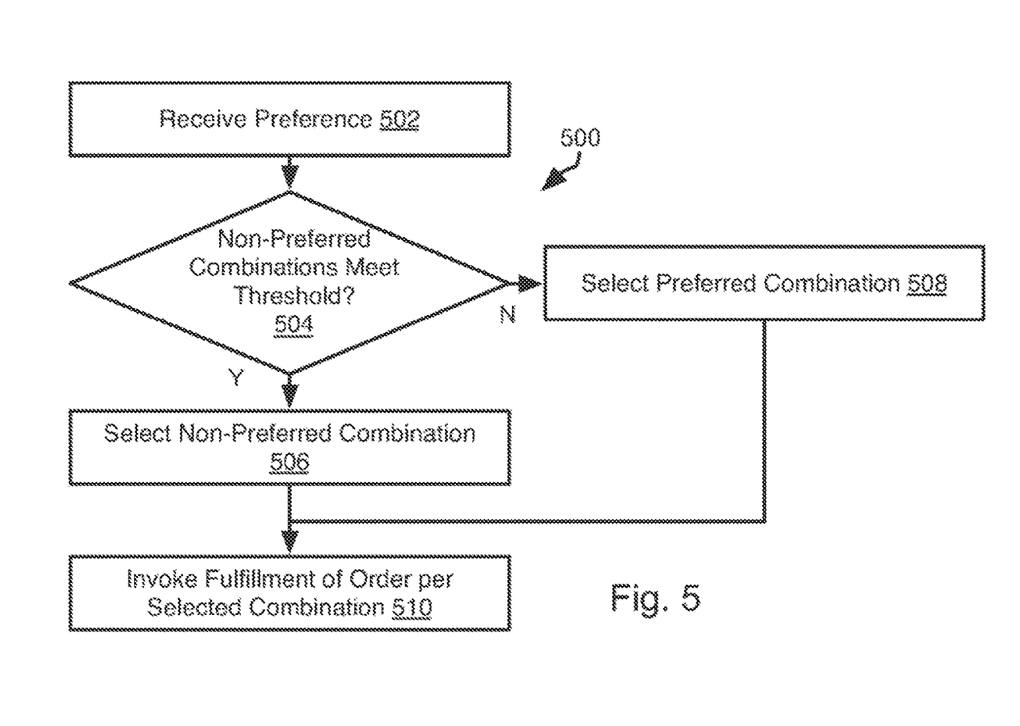
FIG. 5 is a process flow diagram of a method for incorporating a user preference into fulfillment configuration in accordance with an embodiment of the present invention.

Referring to FIG. 5, the illustrated method 500 may be executed as part of the selection step 314 of the method 300. The method 500 may include receiving 502 a user preference, such as by retrieving the preference from the user record 106 of the user who placed the order. The user preference indicates preferred delivery option. The method 500 may then include determining 504 whether any of the combinations that do not include the preferred delivery option meet a threshold condition. For example, the threshold condition may include the score of at least one non-preferred combination has a desirability exceeding the highest scoring preferred combination (i.e. including the preferred delivery option) by a threshold amount. Where a low score indicates greater desirability, the lowest score of the non-preferred combinations must be lower than the lowest score of the preferred combinations by the threshold amount. Where a high score indicates greater desirability, the highest score of the non-preferred combinations must be higher than the highest score of the preferred combinations by the threshold amount in order to meets the threshold condition.

If one of the non-preferred combinations is found 504 to meet the threshold condition, then one of the non-preferred combinations is selected 506. For example, among the non-preferred combinations that meet the threshold condition, the one having the score indicating highest desirability may be selected or a combination may be selected according to a load balancing approach or some other criteria.

If none of the non-preferred combinations meet the threshold condition, then one of the preferred combinations is selected 508 in the same manner as other selections described herein, i.e. the combination with the score indicating highest desirability or according to a load balancing approach or other criteria.

In either case, fulfillment of the order according to the selected combination is then invoked 510 in the same manner as for step 316.

Figure 6:
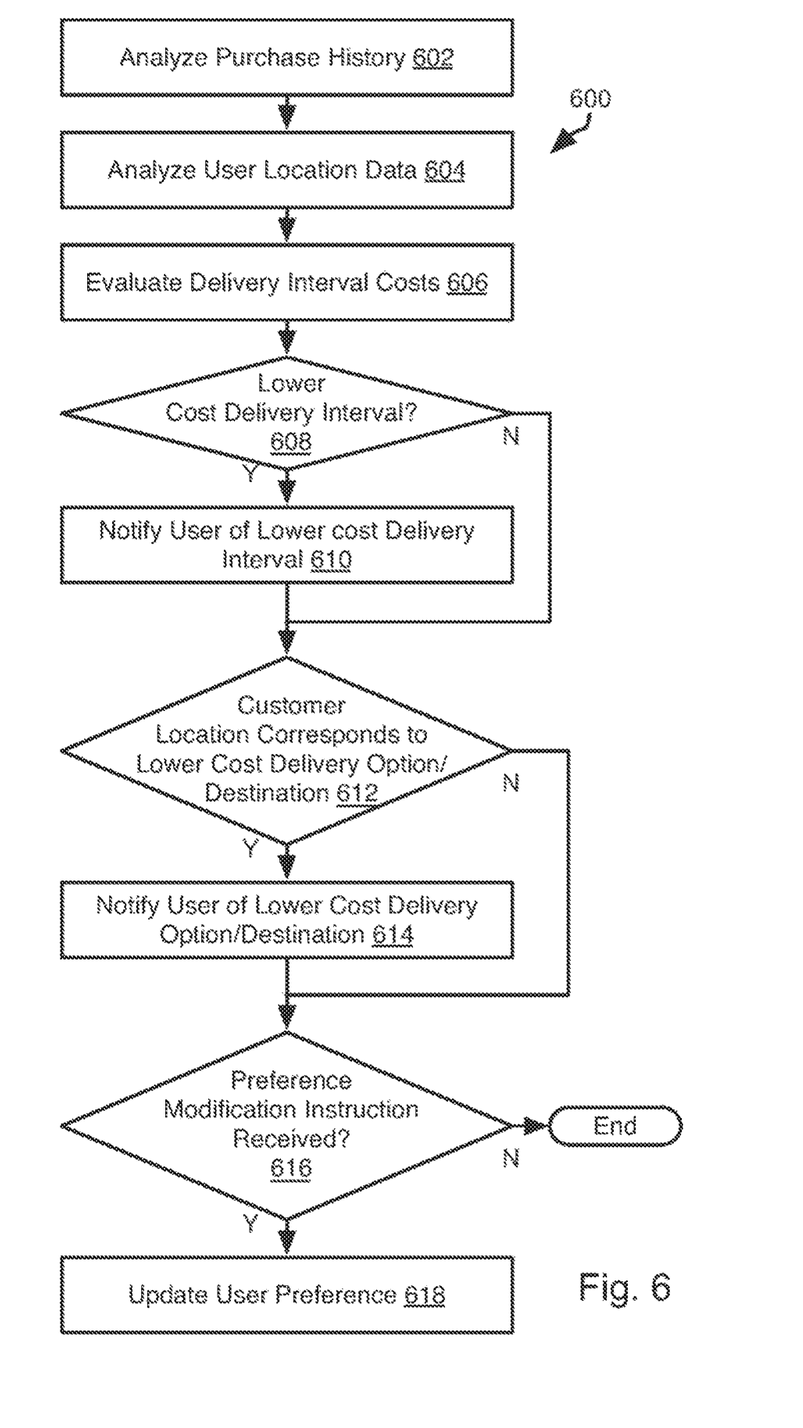
FIG. 6 is a process flow diagram of a method for adjusting user delivery preferences in accordance with an embodiment of the present invention.

Referring to FIG. 6, the illustrated method 600 may be executed by the server system in order to identify cost savings for one or both of the retailer and the user based on the shipping history 108b and shipping preference 108a of the user.

The method 600 may include analyzing 602 the purchase history of the user. In particular, step 602 may identify repeated purchase of the same item. Analyzing 602 the purchase history may include analyzing one or both of online orders and in-store purchase. The output of step 602 may be a list of items that have been purchased at least twice and the quantity of the purchases of each item.

The method 600 may include analyzing 604 user location data 108c. The location data 108c may be analyze to identify commonly occurring locations in the location data, i.e. the user's place of work, retail locations repeatedly visited, partner stores repeatedly visited and the like. Accordingly, the output of step 604 may be a list of possible destinations for making deliveries.

The method 600 may further include evaluating 606 delivery interval costs. In particular, the cost of delivering a product at different intervals with different quantities are evaluated. For example, a customer may purchase X amount of product A every Y weeks. Step 606 may include evaluating the cost (including delivery costs and any price difference) for delivering an amount N*X of product A every N*Y weeks, where N is an integer or fractional. The cost of both purchasing and delivering the product in greater amounts and greater intervals may be compared to the cost of both purchasing and delivering the product in smaller amounts at smaller intervals. In some embodiments, whether a delivery interval is found 608 to be lower cost may take into account a retailer's costs, i.e. delivery intervals that reduce the retailer's costs relative to the user's prior purchase interval may be evaluated at step 608.

If a lower cost delivery interval (and corresponding quantity per order) among those evaluated at step 606 is found 608 (whether the lower cost is for the user or for the retailer, or both), relative to the purchase interval indicated in the user's purchase history, then the user is notified 610, e.g. by email, text, message in the customer's online account, etc., that a lower cost purchasing interval and corresponding quantity would probe a cost savings.

The notification may include interface elements that, when selected by the user, invoke creation of a shipping schedule according to the lower cost purchasing interval. Shipment of the product will then be automatically invoked according to the shipping schedule. In some embodiments, the notification may include a user interface element that, when selected by the user, cancel's one or more pending orders and places a substitute order having the quantity determined to provide lower costs.

The method 600 may further include evaluating 612 whether delivery to locations identified at step 604 would provide lower shipping costs. For example, where one of the locations is a retail location, it may be determined at step 612 that delivery to the retail location would lower shipping costs. Alternatively, a user's office may be closer to a distribution center or retail location from which a product may be shipped. Accordingly, the user's office may be identified at step 612 as providing lower shipping costs then the user's residence.

If a lower cost destination is identified at step 612, then the user may be notified 614 of the lower cost destination. The notification may include interface elements that, when selected by the user, invokes a change of a preferred destination to the lower cost destination in the user record 106 of the user. In some embodiments, the notification may include a user interface element that, when selected by the user, cancel's one or more pending orders and places a substitute order having the destination set to the lower cost destination.

If a user is found 616 to have provided an instruction to change one or both of a delivery interval and delivery destination, then the user preferences 618 are updated according to the user instruction in the user record 106 of the user.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for fulfilling online orders for products, the method comprising:
    receiving, by a server system, an order from a customer for a product;
    identifying, by the server system, a set of potential source locations of units of the product, the set of potential source locations including a distribution center, a retail location, a self-serve vending station, and a partner store;
    identifying, by the server system, for each source location of the set of potential source locations, a set of potential delivery options including a delivery location for each delivery option, the set of potential delivery options including one or more delivery carriers, in-store pick up, and a courier service;
    defining, by the server system, a plurality of combinations, each combination of the plurality of combinations including a source location of the set of potential source locations and a delivery option of the set of potential delivery options;
    determining, by the server system, a score for each combination of the plurality of combinations, the score for each combination being the sum or weighted sum of a delivery time from the source location to the delivery location and a cost of using the delivery option to deliver the product from the source location to the delivery location;
    determining, by the server system, a previously used delivery option by the customer;
    adjusting, by the server system, the scores of a portion of the combinations of the plurality of combinations including the previously used delivery option to decrease the scores of the portion of the combinations that include the previously used delivery option by a predetermined amount;
    selecting, by the server system, a combination of the plurality of combinations having the lowest score;
    invoking, by the server system, shipment of the product to the customer from the source location and using the delivery option of the selected combinations;
    receiving, by the server system, a notification indicating that one of the source location and the delivery option of the selected combination is unavailable;
    selecting, by the server system, a substitute combination of the plurality of combinations having the second lowest score;
    invoking, by the server system, cancelation of the shipment of the product to the customer from the source location and using the delivery option of the selected combination; and
    invoking, by the server system, shipment of the product to the customer from the source location and using the delivery option of the substitute combination.

2. The method of claim 1, wherein receiving the notification indicating that one of the source location and the delivery option of the selected combination is unavailable further comprises:
    detecting an interruption in a supply chain for the product to the source location of the selected combination.

3. The method of claim 2, wherein detecting the interruption in the supply chain comprises detecting a weather event disrupting the supply chain.

4. The method of claim 1, further comprising:
receiving, by the server system, from the customer a preferred delivery option;
wherein, selecting, by the server system, the selected combination comprises:
determining that the score of the selected combination is less than by a threshold amount all scores of one or more combinations of the plurality of combinations including the preferred delivery option; and
in response to determining that the score of the selected combination is less than by the threshold amount all scores of the one or more combinations of the plurality of combinations including the preferred delivery option, selecting the selected combination.

5. The method of claim 1, further comprising:
receiving, by the server system, from the customer a preferred delivery option;
wherein, selecting, by the server system, the selected combination comprises:
determining that no score of the plurality of combinations is less than by more than a threshold amount all scores of one or more combinations of the plurality of combinations including the preferred delivery option; and
in response to determining that no score of the plurality of combination is less than by the threshold amount all scores of the one or more combinations of the plurality of combinations including the preferred delivery option, selecting as the selected combination one of the one or more combinations of the plurality of combinations including the preferred delivery option.

6. The method of claim 1, further comprising:
analyzing, by the server system, a purchase history of the customer for the product;
identifying, by the server system, a purchasing interval providing a cost savings to the customer due to at least one of bulk purchasing and reduced shipping costs; and
transmitting, by the server system, a message to the customer including a recommendation to use the purchasing interval.

7. The method of claim 1, further comprising:
evaluating, by the server system, location data of a mobile computing device of the customer;
identifying, by the server system, a location among the location data of the mobile computing device providing reduced shipping costs;
transmitting, by the server system, a message to the customer including the location and a recommendation to use the location as a shipping destinations
receiving a response from the customer to use the location as the shipping destination; and
selecting, by the server system, a combination of the plurality of combinations having the lowest score that includes the location as the shipping destination.

8. The method of claim 7, wherein evaluating the location data of the mobile computing device comprises receiving notifications of the location of the mobile computing device from an application provided by a retailer associated with the server system.

9. A system for selecting delivery options for customers ordering products, the system comprising:
a set of potential source locations of units of a product, the set of potential source locations including a distribution center, a retail location, a self-serve vending station, and a partner store;
one or more processors and one or more memory devices operably coupled to the one or more processors, the one or more memory devices storing executable code effective to cause the one or more processors to:
receive an order from a customer for the product;
identify for each source location of the set of potential source locations, a set of potential delivery options including a delivery location for each delivery option, the set of potential delivery options including one or more delivery carriers, in-store pick up, and a courier service;
define a plurality of combinations, each combination of the plurality of combinations including a source location of the set of potential source locations and a delivery option of the set of potential delivery options;
determine a score for each combination of the plurality of combinations, the score for each combination being the sum or weighted sum of a delivery time from the source location to the delivery location and a cost of using the delivery option to deliver the product from the source location to the delivery location;
identify a previously used delivery option by the customer;
adjust the scores of a portion of the combinations of the plurality of combinations including the previously used delivery option to decrease the scores of the portion of the combinations that include the previously used delivery option by a predetermined amount;
select a combination of the plurality of combinations having the lowest score; and
invoke shipment of the product to the customer from the source location and using the delivery option of the selected combination;
receive a notification indicating that one of the source location and the delivery option of the selected combination is unavailable;
select a substitute combination of the plurality of combinations having the second lowest score;
invoke cancelation of shipment of the product to the customer from the source location and using the delivery option of the selected combination; and
invoke shipment of the product to the customer from the source location and using the delivery option of the substitute combination.

10. The system of claim 9, wherein the executable code is further effective to cause the one or more processors to receive the notification indicating that one of the source location and the delivery option of the selected combination is unavailable by:
detecting an interruption in a supply chain for the product to the source location of the selected combination.

11. The system of claim 10, wherein detecting the interruption in the supply chain comprises detecting a weather event disrupting the supply chain.

12. The system of claim 9, wherein the executable code is further effective to cause the one or more processors to:
receive from the customer a preferred delivery option;
select the selected combination comprises:
if a score of at least one combination is less than by a threshold amount all scores of one or more combinations of the plurality of combinations including the preferred delivery option, select the at least one combination as the selected combination.

13. The system of claim 12, wherein the executable code is further effective to cause the one or more processors to:

if no score of the plurality of combinations is less than by more than the threshold amount all scores of one or more combinations of the plurality of combinations including the preferred delivery option, select as the selected combination one of the one or more combinations of the plurality of combinations including the preferred delivery option.

14. The system of claim 9, wherein the executable code is further effective to cause the one or more processors to:

analyze a purchase history of the customer for the product;

identify a purchasing interval providing a cost savings to the customer due to at least one of bulk purchasing and reduced shipping costs; and transmit a message to the customer including the purchasing interval.

15. The system of claim 9, wherein the executable code is further effective to cause the one or more processors to:

evaluate location data of a mobile computing device of the customer;

identify a location among the location data of the mobile computing device providing reduced shipping costs;

transmit a message to the customer including the location and a recommendation to use the location as a shipping destinations;

receive a response from the customer to use the location as the shipping destination; and select a combination of the plurality of combinations having the lowest score that includes the location as the shipping destination.

16. The system of claim 15, wherein the executable code is further effective to cause the one or more processors to evaluate the location data of the mobile computing device by receiving notifications of the location of the mobile computing device from an application provided by a retailer associated with the server system.

* * * * *

UNITED STATES PATENT AND TRADEMARK OFFICE
CERTIFICATE OF CORRECTION

PATENT NO. : 10,592,964 B2
APPLICATION NO. : 15/471592
DATED : March 17, 2020
INVENTOR(S) : Donald R. High et al.

Page 1 of 1

It is certified that error appears in the above-identified patent and that said Letters Patent is hereby corrected as shown below:

In the Claims

Column 11, Line 49, Claim 7, delete "destinations" and insert -- destination; --, therefor.

Column 14, Line 7, Claim 15, delete "destinations;" and insert -- destination; --, therefor.

Signed and Sealed this
Eleventh Day of August, 2020

Andrei Iancu
*Director of the United States Patent and Trademark Office*